(12) United States Patent
Estep et al.

(10) Patent No.: US 10,857,578 B2
(45) Date of Patent: Dec. 8, 2020

(54) SOIL WASHING PROCESS AND APPARATUS

(71) Applicant: Allen Shane Estep, Odessa, TX (US)

(72) Inventors: Allen Shane Estep, Odessa, TX (US); Darren Davis Harris, La Vernia, TX (US)

(73) Assignee: Allen Shane Estep, Odessa, TX (US)

( * ) Notice: Subject to any disclaimer, the term of this patent is extended or adjusted under 35 U.S.C. 154(b) by 125 days.

(21) Appl. No.: 16/127,718

(22) Filed: Sep. 11, 2018

(65) Prior Publication Data
US 2019/0076895 A1 Mar. 14, 2019

Related U.S. Application Data

(60) Provisional application No. 62/556,929, filed on Sep. 11, 2017.

(51) Int. Cl.
 *B09C 1/02* (2006.01)
 *B03B 5/02* (2006.01)
 *B08B 3/08* (2006.01)

(52) U.S. Cl.
 CPC .............. *B09C 1/02* (2013.01); *B03B 5/02* (2013.01); *B08B 3/08* (2013.01)

(58) Field of Classification Search
 None
 See application file for complete search history.

(56) References Cited

U.S. PATENT DOCUMENTS

| | | | | |
|---|---|---|---|---|
| 5,056,541 A | * | 10/1991 | Schade | B03D 1/02 134/10 |
| 2004/0241073 A1 | * | 12/2004 | Saran | B09C 1/02 423/322 |
| 2014/0345649 A1 | * | 11/2014 | Jung | B09C 1/02 134/13 |

* cited by examiner

*Primary Examiner* — Mikhail Kornakov
*Assistant Examiner* — Ryan L. Coleman
(74) *Attorney, Agent, or Firm* — Patrick K. Steele

(57) ABSTRACT

A soil washing process includes mixing water and contaminated soil in a log washer, separating the soil and water mixture into a first stream of wet soil and a second stream of water and floating organic materials, dewatering the first stream of wet soil to form a cleaned soil stream, dewatering the second stream to separate out the organic materials and form a water stream, separating the water stream into a stream of non-colloidal particulates and a stream of colloid-containing water, dewatering the stream of non-colloidal particulates, and adding the stream of colloid-containing water to the soil and water mixture. The method may further include returning a first portion of the colloid-containing water to the log washer, and drawing off a second portion of the colloid-containing water to filter out the colloids before returning a clean water stream to the log washer.

6 Claims, 6 Drawing Sheets

SOIL WASHING PROCESS AND APPARATUS

BACKGROUND

The present disclosure relates to methods and apparatus for cleaning contaminated soil.

BACKGROUND OF THE RELATED ART

Soil may become contaminated with various materials, chemicals and substances for a wide range of reasons. Once contaminated, it may take a considerable effort to remove or remediate the contamination from the soil. Any removal or remediation of soil can become expensive due to the cost associated with the excavation, transportation, disposal of the waste and the transportation of clean backfill back to the site to fill the excavation.

As an example, water that is produced during oil and gas production may occasionally escape containment and contaminate the nearby soil. The produced water often contains high concentrations of dissolved solids, including salts, which may damage the ecology of the affected area. As a result, removal and/or remediation of the soil may become necessary to reduce the salt content of the soil.

BRIEF SUMMARY

One embodiment provides an apparatus comprising a log washer, sand screw, first dewatering shaker and a hydrocyclone separator. The log washer has a feed end for receiving water and contaminated soil, two or more log shafts with paddles for mixing the soil and water, and a discharge end for discharging the soil and water mixture. The sand screw has a lower end forming a weir box, an upper discharge end, and a screw that draws wet soil collecting in the bottom of the weir box from the lower end to the upper discharge end while allowing water to drain out of the wet soil into the weir box, wherein the weir box is positioned below the discharge end of the log washer to receive the soil and water mixture discharged from the log washer, and wherein the weir box includes a weir allowing water and floating organic materials to flow over the weir. The first dewatering shaker has a shaker table for receiving the wet soil discharged from the upper discharge end of the sand screw, a screen for separating water from the wet soil to form a cleaned soil discharge, a catch pan for collecting the water that passes through the screen, and a discharge end for discharging the cleaned soil. The hydrocyclone separator has an inlet for receiving the water that overflows the weir, a solids outlet dispensing solids onto the first dewatering shaker, and a water outlet.

Another embodiment provides a method comprising: mixing water and contaminated soil in a log washer; separating the soil and water mixture into a first stream of wet soil and a second stream of water and floating organic materials; dewatering the first stream of wet soil to form a cleaned soil stream; dewatering the second stream to collect the organic materials and form a water stream; separating the water stream into a stream of non-colloidal particulates and a stream of colloid-containing water; dewatering the stream of non-colloidal particulates; and adding the stream of colloid-containing water to the soil and water mixture.

DETAILED DESCRIPTION

Figure 1:
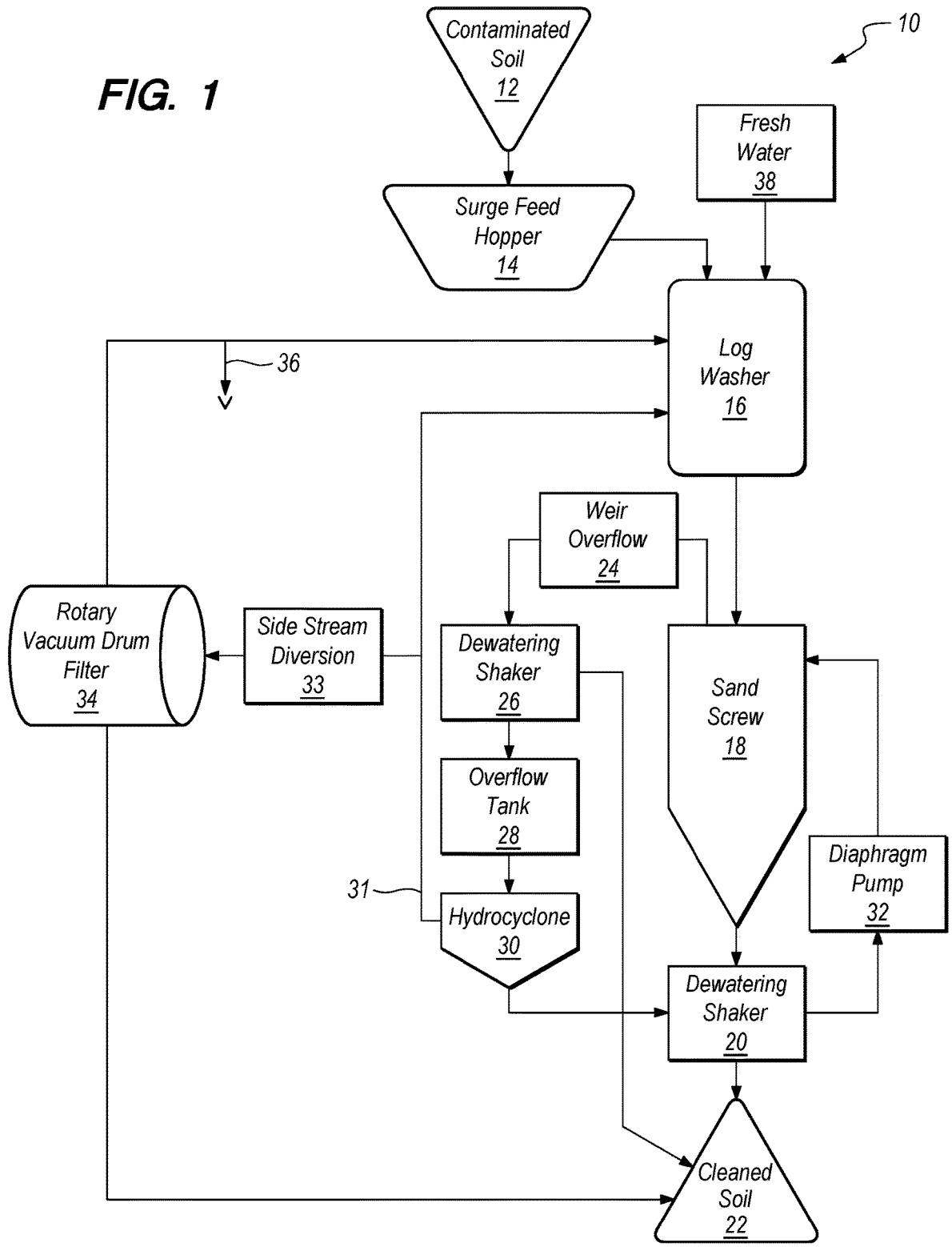
FIG. 1 is a flowchart of a method according to one embodiment of a soil washing process.

One embodiment provides an apparatus comprising a log washer, sand screw, first dewatering shaker and a hydrocyclone separator. The log washer has a feed end for receiving water and contaminated soil, two or more log shafts with paddles for mixing the soil and water, and a discharge end for discharging the soil and water mixture. The sand screw has a lower end forming a weir box, an upper discharge end, and a screw that draws wet soil collecting in the bottom of the weir box from the lower end to the upper discharge end while allowing water to drain out of the wet soil into the weir box, wherein the weir box is positioned below the discharge end of the log washer to receive the soil and water mixture discharged from the log washer, and wherein the weir box includes a weir allowing water and floating organic materials to flow over the weir. The first dewatering shaker has a shaker table for receiving the wet soil discharged from the upper discharge end of the sand screw, a screen for separating water from the wet soil to form a cleaned soil discharge, a catch pan for collecting the water that passes through the screen, and a discharge end for discharging the cleaned soil. The hydrocyclone separator has an inlet for receiving the water that overflows the weir, a solids outlet dispensing solids onto the first dewatering shaker, and a water outlet.

The present soil washing process may be used to remove any of a variety of contaminants from a contaminated soil. For example, the contaminant may be one or more salt, such as a mixture of salts resulting from a brine spill. Since the salts have a high affinity for water, the present soil wash process may effectively remove the salt using water as the solvent. In fact, since salt is highly soluble in water, the water has a high capacity for salt uptake and may continue to extract salt from the soil even as the water approaches saturation with salt. While the salt may be the intended solute or target solute, other water-soluble contaminants may also be removed. Specifically, the present soil washing process may remove both salts and other water soluble contaminants, or the present soil washing process may remove any one or more water soluble contaminant regardless of whether or not the soil is also contaminated with salt. As used herein, the term "contaminant" is intended in its broader sense to include any constituent of the soil that is either unwanted in the soil or is desired to be removed from the soil. For example, certain salts or other contaminants may have significant value after being removed from the soil, and such significant value does not exclude those constituents from being referred to herein as contaminants.

Furthermore, the present soil washing process may be used to remove any of a variety of contaminants from a contaminated soil, even if the water solubility of the contaminant is low. For example, the solvent may be a mixture of water and a surfactant, where the surfactant is selected to enhance the solubility of the contaminant in the water. A solvent including a mixture of water and one or more surfactant may be used to remove one or more hydrocarbon contaminant from the soil. Still further, the type and concentration of surfactant in the water may be selected in order to remove a target contaminant, such as a salt, hydrocarbon, organic compound, or inorganic compound. Without limitation, the surfactant may be selected from the group consisting of anionic surfactants, cationic surfactants, zwitterionic surfactants, nonionic surfactants, and combinations thereof. Even further, the present soil washing process may be used to remove a portion of a contaminant from a contaminated soil, while simultaneously introducing one or more other compound or material into the soil. In this respect, the soil washing process may encompass aspects of a bioremediation process by enhancing remediation of contaminants that are not entirely removed by washing.

The water used in the soil washing process is preferably obtained from a fresh water source, such as pond, lake, river, stream or municipal water source. The water may be sourced from any fresh water source and staged in a tank for immediate access and use in the process. The overall purity of the water is not critical as long as the water has the capacity to dissolve the target contaminant. For example, where the target contaminant is salt, the water should not be already saturated with salt. Most fresh water sources will have a sufficiently low concentration of salt to remove salt from the soil according to the present soil washing process. Salt concentration may, without limitation, be measured or quantified as "chlorides" or "total dissolved solids."

The log washer and weir box are preferably filled with water prior to introducing the contaminated soil. Additional amounts of water may be periodically or continuously added to the process as necessary or desired to either make-up for water carried out of the process with the cleaned soil or to makeup for water intentionally withdrawn from the process when the measured salt concentration of the water meets or exceeds a desired salt concentration. Specifically, the water should not be allowed to become saturated with salt or other target contaminant, since the water would no longer be able to dissolve any further amount of salt or other target contaminant from the soil. While additional amounts of water may be added to process in any one or more locations, the water may be added to the log washer for mixing with the contaminated soil and water that has been recycled from the back end of the process, such as from the hydrocyclone and/or the one of a rotary vacuum drum filter and one or more centrifuges.

Periodic or continuous measurements of the salt concentration in the cleaned soil may be performed to verify the effectiveness of the present soil washing process and to verify that the contaminant concentration in the cleaned soil has met target concentrations that permit the cleaned soil to be returned to the land. If the measurements indicate that the salt concentration in the cleaned soil is rising, then the process may be slowed down in order to provide a greater amount of contact time between the soil and water.

The apparatus may further include a second dewatering shaker having a shaker table for receiving the water overflowing the weir, a screen for separating out any floating organic materials within the water overflowing the weir, and a catch pan for collecting the water, wherein the water collected in the catch pan is provided to the inlet of the hydrocyclone separator. The weir removes floating organic materials, such as grass, sticks and roots, which may interfere with the operation of the hydrocyclone or otherwise simply collect in the weir box. The second dewatering shaker includes a screen that allows the water to pass through to the catch pan while discharging the organic materials from the screen. Depending upon the objectives of the site remediation, the organic materials may be returned to the site or otherwise discarded.

Various embodiments include water collection and recycling in order to conserve the amount of water required to perform the soil washing process. This has the benefit of reducing the amount of water that must be obtained and delivered to the job site, as well as reducing the amount of spent water that must be discarded once the water approached saturation or otherwise no longer supports the soil washing process. In one preferred embodiment, the water collected in the catch pan for the first dewatering shaker is plumbed to return to the weir box. For example, the catch pan may have a drain pipe coupled to a pump that transfers water from the catch pan to the weir box whenever the water level in the catch pan reaches a certain level, perhaps as measured by a level sensor or float. In another preferred embodiment, the water outlet from the hydrocyclone separator is coupled to a recycle pipe that returns the water to the log washer.

A further embodiment of the apparatus includes a side stream pipe extending from the recycle pipe, and a valve for controlling water flow through the side stream pipe. The valve and side stream pipe enable the periodic or continuous diversion of some portion of the water outlet from the hydrocyclone separator. As water in used to remove a contaminant from the soil and recycled, the water will become ever more concentrated with the contaminant but also more concentrated with suspended particles, also referred to as colloids. The water diverted through the side stream pipe is delivered to a process unit that is able to remove the suspended solids from the water before returning the water to the log washer.

In another embodiment, the process unit that receives water from the side stream pipe and removes suspended particles from the received water to form clean water is a one of a rotary vacuum drum filter and one or more centrifuges. The water received from the side stream pipe is directed into a tub and the drum rotates with a bottom portion of drum positioned in the tub. A vacuum within the drum draws liquid and solids onto the drum filter media, such as a pre-coat of diatomaceous earth. The water passes through the filter media and is collected inside a receiver tank before returning to the log washer. The one of a rotary vacuum drum filter and one or more centrifuges removes suspended solids from the water, but it does not remove the salt from the water. The suspended solids coming off the one of a rotary vacuum drum filter and one or more centrifuges are cleaned of the contaminant because the salts remain dissolved in the water as the water is pulled through the filter media. A non-limiting embodiment of the one of a rotary vacuum drum filter may have a precoat style filter comprising a layer of diatomaceous earth that is built up on the surface of the drum, and may pull a vacuum on all sections of the drum equally. The suspended solids that accumulate on the filter material may be scraped off with a blade as the drum rotates. As the solids are scraped off, a small amount of the diatomaceous earth may be removed along with the soil to expose a fresh filter surface as the drum rotates back into the process water slurry. Accordingly, the cleaned soil output from the vacuum drum filter may contain a small amount of diatomaceous earth along with the previously suspended solids.

Embodiments of the present soil washing apparatus may be manually controlled by turning each process unit on and off as needed to maintain adequate soil and water in each process unit. For example, if the log washer and sand screw are initially filled with water, most of the water either remains in the log washer or is returned to the log washer. As a result, the rate at which contaminated soil can be washed is limited by the capacity of the dewatering shakers, the sand screw and the log washer. The rotational speed of the sand screw may be manually controlled to a rate that does not overwhelm the dewatering shaker with too much soil. Further, the rate at which contaminated soil is introduced into the log washer can be controlled to assure adequate contact between the soil and water within the log washer and to prevent an excessive amount of soil from accumulating within the weir box to the sand screw. The rate at which contaminated soil is introduced to the log washer may be controlled by a feed hopper outlet or by using a front end loader to add soil only as needed.

Other embodiments of the present soil washing apparatus may include various extents of automation. Such automation may be controlled by analog components, but are preferably controlled by a computer. A ruggedized or customized computer, such as a programmable logic controller (PLC), may be used for automated control of one or more component or process unit of the present soil washing apparatus. In one example, a computer may receive input from a water level sensor in the receiver tank below the two-deck dewatering shaker, and may output a control signal to a pump coupled to the water outlet of the receiver tank. Accordingly, the computer may control the water level in the tank by selectively turning the pump on and off In another example, the computer may control a valve in a side stream diversion pipe that branches off from the closed loop return to the log washer and extends to an inlet to the one of a rotary vacuum drum filter and one or more centrifuges. Similarly, the computer may control the operations of the one of a rotary vacuum drum filter, such as managing a duty cycle that turns on a vacuum pump and a drum rotation motor or a centrifuge spin motor whenever the water level in the bath around the one of a rotary vacuum drum filter and one or more centrifuges reaches a desired level as indicated by a level sensor. Optionally, the valve in the side stream diversion pipe may be set to provide a constant flow rate to the one of a rotary vacuum drum filter and one or more centrifuges, which may be run continuously.

Periodic or continuous measurements of the salt concentration in the recycle water from the hydrocyclone and/or the one of a rotary vacuum drum filter and one or more centrifuges may be performed to determine when to discharge an amount of water having a high salt concentration and add an amount of fresh water. For example, an in-line salinity meter may be installed in one or more of the water recycle lines to the log washer. The salinity meter may provide a salinity measurement signal to the computer, which may be programmed to monitor the salinity and to automatically open a discharge valve and open a fresh water makeup valve. The discharge valve preferably directs the high salinity water to a salt water injection well that is permitted for that purpose.

Embodiments of the soil washing apparatus may be trailer-mounted to facilitate mobilization to a spill location or site, where contaminated soil is excavated and placed directly into the soil washing apparatus for contaminant removal. Once the soil has been cleaned, the cleaned soil can be promptly returned to the site. Since the contaminated soil does not need to be removed from the site for treatment or disposal, the operator will benefit from reduced costs and the avoidance of potential liability.

The trailers may have a transportation state and an operation state. For example, certain process units may be detached or moved for storage during transportation, then connected or installed in a different position for operation of the present soil washing process. For example, pipes, electrical power lines and connections for sensor and control wires must be configured after the trailers are parked in position on site. Furthermore, either or both trailers may be supported by equipment assembled after locating the trailers on site. For example, a surge feed hopper and infeed conveyor may be positioned next to the trailers to controllably deliver contaminated soil to the inlet end of the log washer. Furthermore, an outfeed conveyor may be positioned to stack soil that exits off the two-deck dewatering screen on the back of trailer two into a truck bed or a pile that can be accessed by earth moving equipment, such as a front end loader or bulldozer.

The trailer with the one of a rotary vacuum drum filter and one or more centrifuges may also include equipment that supports the operation of the one of a rotary vacuum drum filter and one or more centrifuges. In the example shown, the equipment includes a vacuum pump, receiver tank, filtrate pump and oil chiller. The vacuum pump may be a liquid ring vacuum pump that is used to provide the vacuum source for the filter. The receiver tank may receive an air/liquid stream that is pulled from the filter. In one embodiment, the flow of the air/liquid stream enters the receiver tank tangentially and uses centrifugal separation to separate the filtrate liquids from the air. The filtrate pump is used to remove the accumulated liquids from the receiver tank, and pump them back to trailer two and into the process flow, such as into the log washer. The oil chiller is used to maintain a constant temperature of the seal liquid, since the efficiency of the liquid ring vacuum pump is greatly affected by the seal liquid temperature.

An additional embodiment of the apparatus further includes a power generator for powering the process units of the soil washing apparatus, such as the log washer, sand screw, first dewatering shaker, second dewatering shaker, hydrocyclone separator, one of a rotary vacuum drum filter and one or more centrifuges, pumps and control systems. Optionally, a first trailer may carry the log washer, sand screw, first dewatering shaker, second dewatering shaker, and hydrocyclone separator, and a second trailer may carry the one of a rotary vacuum drum filter and one or more centrifuges and the power generator. Connections between components on the first trailer and components on the second trailer are made after parking the first and second trailers proximate to a work site having contaminated soil. Such connections include fluidic connections, electrical power connections, and sensor and control signal line connections.

Another embodiment provides a method comprising: mixing water and contaminated soil in a log washer; separating the soil and water mixture into a first stream of wet soil and a second stream of water and floating organic materials; dewatering the first stream of wet soil to form a cleaned soil stream; dewatering the second stream to collect the organic materials and form a water stream; separating the water stream into a stream of non-colloidal particulates and a stream of colloid-containing water; dewatering the stream of non-colloidal particulates; and adding the stream of colloid-containing water to the soil and water mixture. The method may optionally produce the cleaned soil stream periodically or continuously over a period of time.

After mixing water and contaminated soil in the log washer, the method may separate the soil and water mixture in a sand screw. The sand screw may deliver the wet soil to dewatering unit, such as a dewatering shaker, which forms a water stream that is recycled for mixing with additional amounts of soil.

In a preferred option, the water stream is separated into a stream of non-colloidal particulates and a stream of colloid-containing water using a hydrocyclone. At least a first portion of the stream of colloid-containing water is preferably returned to the log washer for mixing with additional amounts of contaminated soil. In a further option, the method may draw off a second portion of the stream of colloid-containing water, filter the colloidal particulates from the second portion of the stream of colloid-containing water to form a clean water stream, and return the clean water stream to the log washer. The filtering may be performed with a one of a rotary vacuum drum filter and one or more centrifuges.

Still further, the method may measure the contaminant concentration in the filtered water, and control an amount of the water stream that is discharged and replaced with fresh water in order to maintain the measured contaminant concentration below a predetermined concentration. In addition to controlling how much water is discharged and replaced, the method may slow down the rate at which soil is added to the log washer and/or the rate at which the cleaned soil is separated from the water in order to increase the contact time between the soil and water.

Embodiments may utilize computer program products including program instructions for implementing or initiating any one or more aspects of the methods described herein. For example, a computer program product may include a non-transitory computer readable storage media having program instructions embodied therewith, wherein the program instructions are executable by a processor to control the soil washing apparatus to perform any of the disclosed soil washing processes. Accordingly, a separate description of the methods will not be duplicated in the context of a computer program product. Embodiments of the apparatus may further include at least one storage device for storing program instructions and at least one processor for processing the program instructions to control the soil washing apparatus to perform any of the disclosed soil washing processes.

FIG. 1 is a flowchart of one embodiment of a soil washing process 10. A source of contaminated soil 12 is identified and then delivered into a surge feed hopper 14. The contaminated soil is controllably released into a log washer 16, where the contaminated soil is broken up and mixed with water. The soil and water from the log washer then spills over into a weir box of a sand screw 18, wherein the sand screw draws wet soil collecting in the bottom of the weir box from a lower end to an upper discharge end while allowing water to drain out of the wet soil back into the weir box. Wet soil is discharged from the sand screw to a dewatering shaker 20. The two deck dewatering shaker removes water from the wet soil and discharges a cleaned soil 22.

The weir box of the sand screw 18 has a weir overflow 24 that delivers water and floating organic material to a dewatering shaker 26. The dewatering shaker 26 separates out any floating organic materials and soil within the water overflowing the weir and discharges these solids as cleaned soil 22. The water separated in the dewatering shaker 26 is provided to an overflow tank 28 and then to an inlet of a hydrocyclone separator 30. The hydrocyclone separator has an inlet for receiving the water from the overflow tank 28, a solids outlet dispensing solids onto the dewatering shaker 20, and a water outlet. As previously described, the solids that do no pass through the dewatering shaker 20, whether from the hydrocyclone 30 or the sand screw 18, are discharged as cleaned soil 22. The water collected by the dewatering shaker 20 is output to a diaphragm pump 32 that returns the water to the sand screw 18.

The water outlet from the hydrocyclone 30 is returned to the log washer 16 via a recycle pipe 31. A side stream pipe 33 is coupled to the recycle pipe, and may include a valve for controlling water flow through the side stream pipe 33. The valve and side stream pipe enable the periodic or continuous diversion of some portion of the water outlet from the hydrocyclone separator. The water diverted through the side stream pipe 33 is delivered to a one of a rotary vacuum drum filter and one or more centrifuges 34 that is able to remove the suspended solids from the water before returning the water to the log washer 16. The vacuum drum filter also produces additional cleaned soil 22.

After running the process for a period of time, the concentration of the contaminant in the process water will rise. When the water approaches its capacity for the contaminant, some of the water may be discharged through a drain line 36, which may communicate with a tank or injection well. Fresh water 38 may be periodically or continuously added to the process as necessary or desired to either makeup for water carried out of the process with the cleaned soil 22 or to makeup for water intentionally discharged through the drain line 36.

Figure 2A:
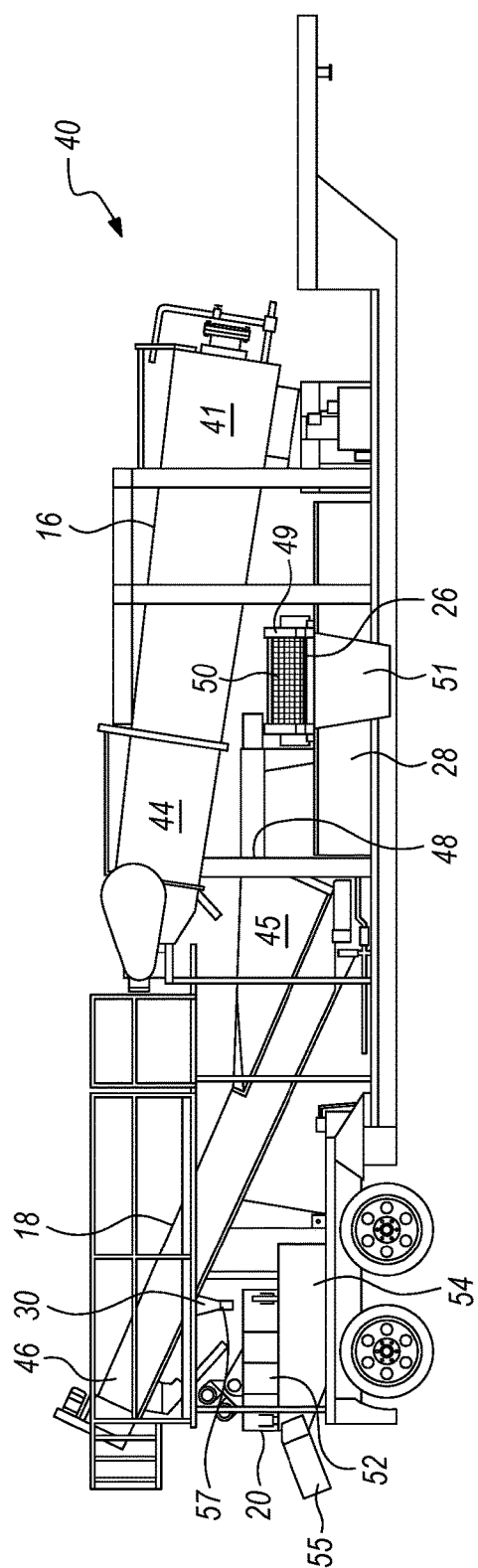
FIGS. 2A and 2B provide a side view and a top view, respectively, of a first mobile trailer securing process equipment for implementing a soil washing process.
Figure 2B:
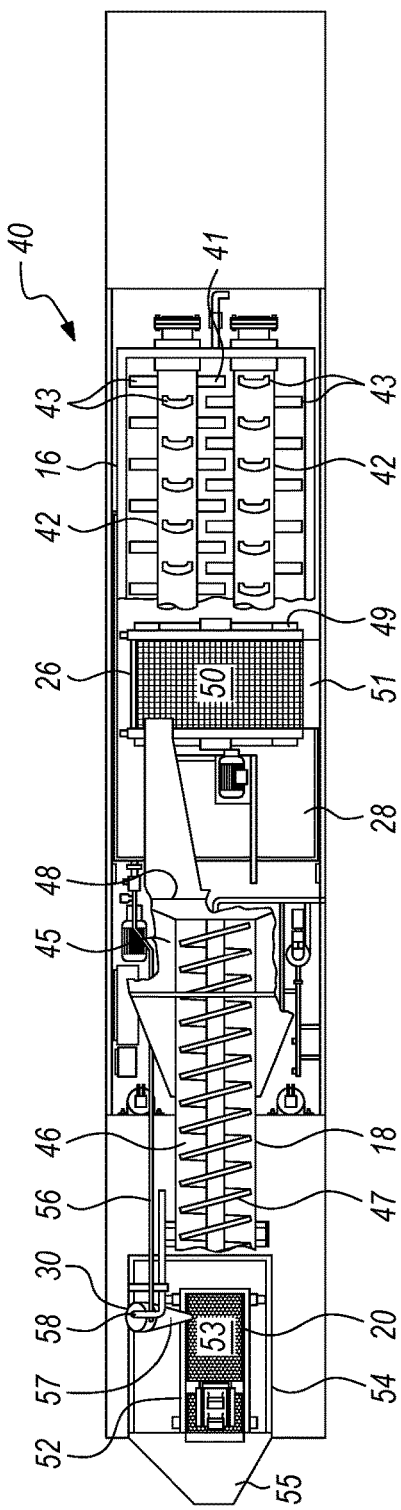

FIGS. 2A and 2B provide a side view and a top view (with partial cut-aways), respectively, of a first mobile trailer 40 securing process equipment for implementing a soil washing process. This embodiment includes a log washer 16, sand screw 18, first dewatering shaker 20 and a hydrocyclone separator 30. The log washer 16 has a feed end 41 for receiving water and contaminated soil, two or more log shafts 42 with paddles 43 for mixing the soil and water, and a discharge end 44 for discharging the soil and water mixture. The sand screw 18 has a lower end forming a weir box 45, an upper discharge end 46, and a screw 47 that draws wet soil collecting in the bottom of the weir box 45 from the lower end to the upper discharge end 46 while allowing water to drain out of the wet soil back into the weir box 45, wherein the weir box 45 is positioned below the discharge end 44 of the log washer 16 to receive the soil and water mixture discharged from the log washer. The weir box 45 includes a weir 48 allowing water and floating organic materials to flow over the weir to the second dewatering shaker 26 having a shaker table 49 for receiving the water overflowing the weir 48, a screen 50 for separating out any floating organic materials within the water overflowing the weir, and a catch pan or overflow tank 28 for collecting the water. The water collected in the overflow tank 28 is subsequently provided to the inlet of the hydrocyclone separator 30. The weir 48 removes floating organic materials, such as grass, sticks and roots, which may interfere with the operation of the hydrocyclone 30 or otherwise simply collect in the weir box 45. The screen 50 that allows the water to pass through to the overflow tank 48 while discharging the organic materials from the screen to a discharge chute 51. Depending upon the objectives of the site remediation, the organic materials may be returned to the site or otherwise discarded.

The apparatus 40 further includes a first dewatering shaker 20 having a shaker table 52 for receiving the wet soil discharged from the upper discharge end 46 of the sand screw 18, a screen 53 for separating water from the wet soil to form a cleaned soil discharge, a catch pan 54 for collecting the water that passes through the screen 53, and a discharge end 55 for discharging the cleaned soil. The hydrocyclone separator 30 has an inlet 56 for receiving the water from the overflow tank 28, a solids outlet 57 dispensing solids onto the first dewatering shaker 20, and a water outlet 58. The water outlet 58 from the hydrocyclone separator 30 is preferably coupled to a recycle pipe that returns the water to the log washer 16.

The system 40 is preferably filled with water and put into full circulation prior to adding soil to the log washer 16. During normal operating conditions, the log washer is full of water, and as process water is returned from the hydrocyclone 30, water and soil overflow the logwasher into the sand screw and eventually to the dewatering shaker 20. Accordingly, the process may be considered as having a closed loop process water circuit that circulates constantly while in operation. Over time, fresh makeup water will be added as needed to replace lost water, and also to keep chloride levels in the process water within acceptable levels.

Non-limiting examples of the process units are provided to illustrate how an embodiment of the present soil washing process may be implemented. It should be understood that each process unit may be variably designed or obtained from various manufacturers and may be a different size, model or style. Furthermore, the present soil washing process may be implemented with other process units that are known substitutes or equivalents of the disclosed process units.

A suitable log washer includes an Eagle Iron Works 24"×18' log washer. In one embodiment of the present soil washing process, the soil is given additional hold time in the log washer by bypassing the overflow gate, which forces the water to run over the outlet of the log washer along with the soil. A suitable sand screw includes an Eagle Iron Works 24"×20' sand screw. A suitable dewatering shaker includes a Kolman-Athey 3'×6' dewatering shaker with a single deck screen to remove floating organic material, such as sticks, grass, and roots. A suitable hydrocyclone includes a Kem-Tron 10" desander, which removes sand and solids down to about 50 microns at up to about 450 gallons per minute (GPM). Another suitable dewatering shaker includes a Kem-Tron 32"×48" unit having two decks with different mesh sizes to dewater effluent from the hydrocylone as well as solids from sand screw.

Figure 3:
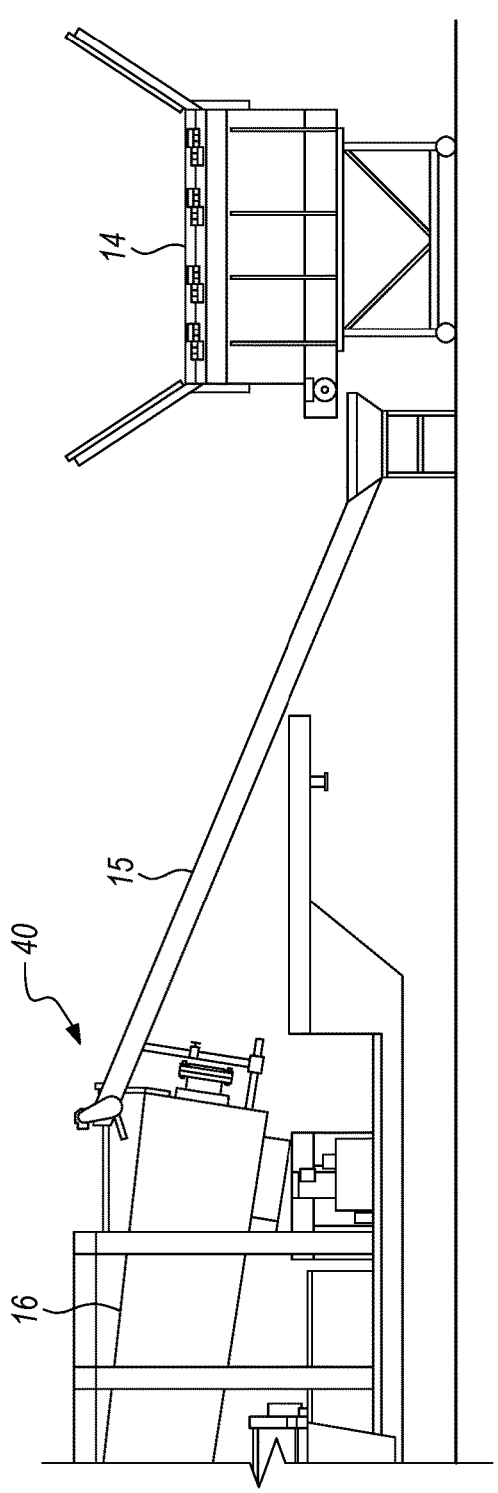
FIG. 3 is a side view of a feed hopper and infeed conveyor for delivering contaminated soil to the log washer.

FIG. 3 is a side view of a feed hopper 14 and infeed conveyor 15 for delivering contaminated soil to the log washer 16 that is on the trailer 40. The feed hopper 14 and infeed conveyor 15 may be transported to the work site on the trailer 40 or on a separate truck or trailer, and are preferably self-supporting during operation.

Figure 4:
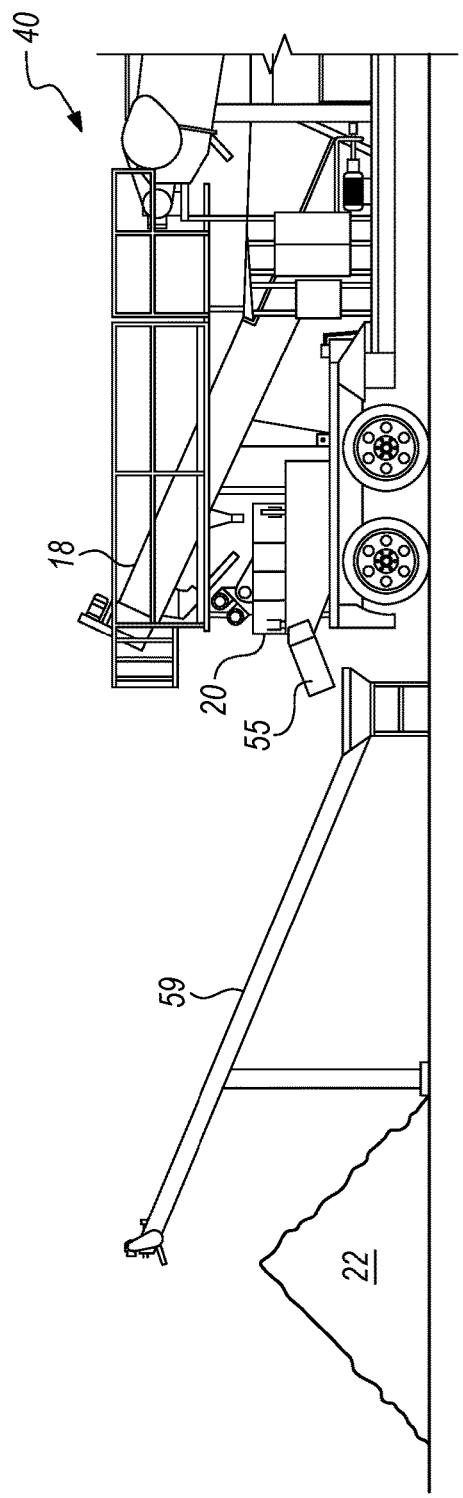
FIG. 4 is a side view of an outfeed conveyor for moving cleaned soil away from the dewatering shaker.

FIG. 4 is a side view of an outfeed conveyor 59 for moving cleaned soil away from the dewatering shaker 50. The outfeed conveyor 59 is preferably self-supporting and positioned to receive the cleaned soil that comes off the discharge chute 55 from the dewatering shaker 20 below the discharge end of the sand screw 18.

Figure 5A:
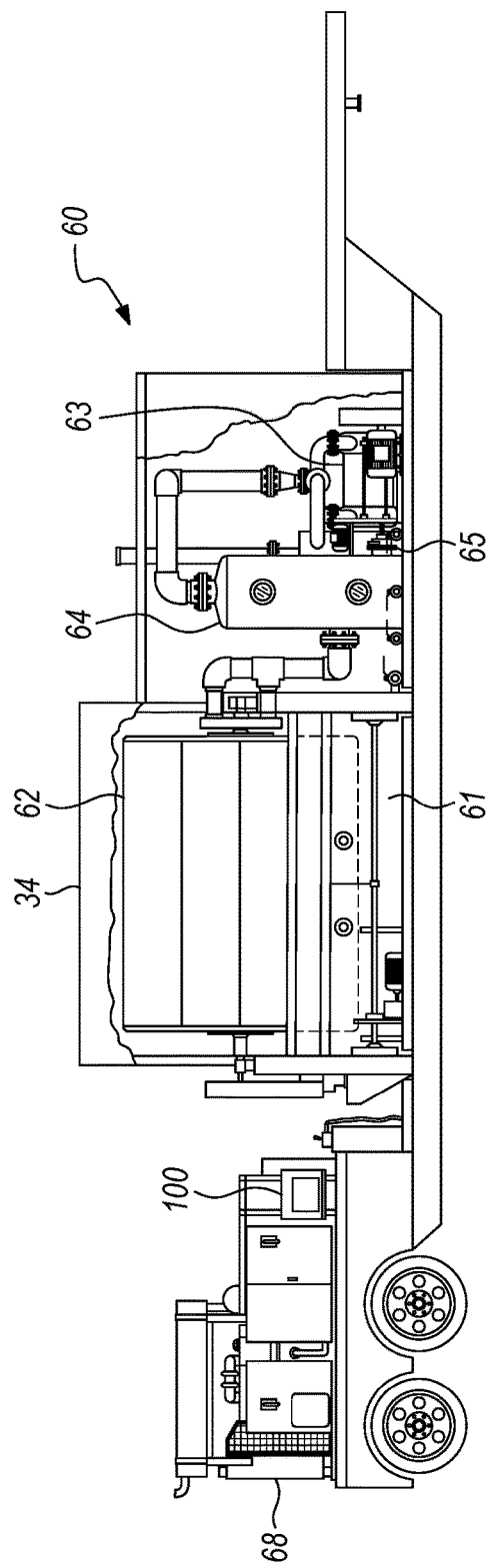
FIGS. 5A and 5B provide a side view and a top view, respectively, of a second mobile trailer securing process equipment for implementing additional process units of a soil washing process.
Figure 5B:
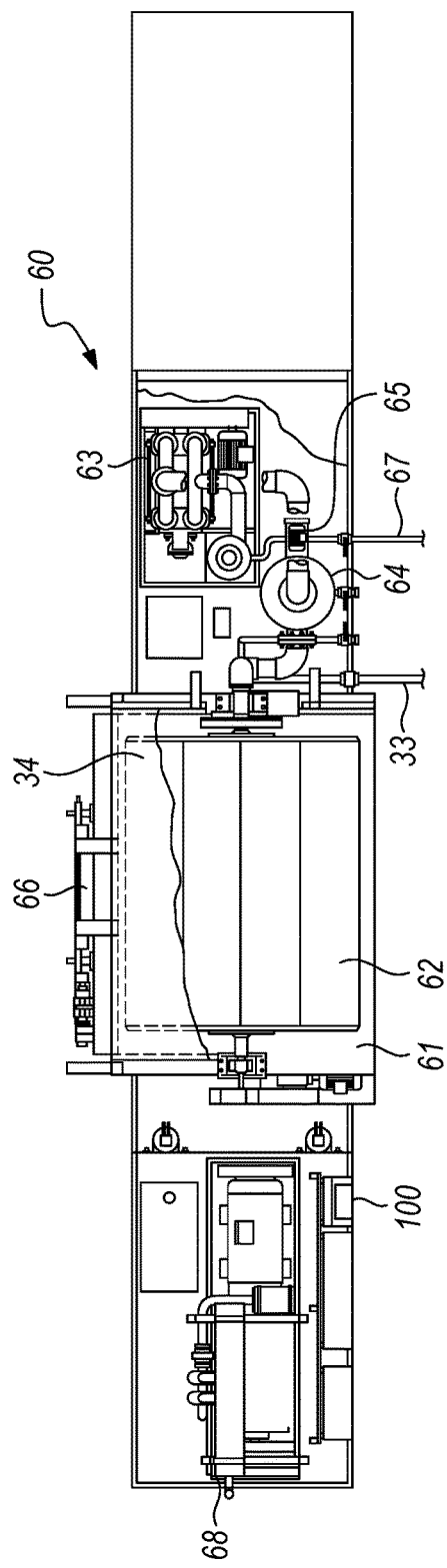

FIGS. 5A and 5B provide a partial-cutaway side view and top view, respectively, of a second mobile trailer 60 securing process equipment for implementing additional process units of a soil washing process. The second mobile trailer 60 includes a one of a rotary vacuum drum filter and one or more centrifuges 34 that receives water from the side stream pipe 33 and removes suspended particles from the received water to form clean water. A suitable rotary vacuum drum filter includes an Eimco 8'×10' precoat unit, which provides 250 square feet of continuous filtration for polishing process water diverted from a recycle stream output from the hydrocyclone.

The water received from the side stream pipe is directed into a tub 61 and the drum 62 rotates with a bottom portion of drum positioned in the tub. A vacuum pump 63 draws a vacuum within the drum 62 draws liquid and solids onto the drum filter media on the outer surface of the drum 62, such as a pre-coat of diatomaceous earth. The water passes through the filter media and is collected inside a receiver tank 64, for returning to the log washer using the filtrate pump 65 and return pipe 67. The suspended solids coming off the one of a rotary vacuum drum filter and one or more centrifuges are cleaned of the contaminant because the salts remain dissolved in the water as the water is pulled through the filter media. The suspended solids that accumulate on the filter material may be scraped off with a blade 66 as the drum rotates. As the solids are scraped off, a small amount of the diatomaceous earth may be removed along with the soil to expose a fresh filter surface as the drum rotates back into the process water slurry. Accordingly, the cleaned soil output from the vacuum drum filter may contain a small amount of diatomaceous earth along with the previously suspended solids.

The trailer 60 further includes a power generator 68 for powering the process units of the soil washing apparatus, such as the log washer, sand screw, first dewatering shaker, second dewatering shaker, hydrocyclone separator, one of a rotary vacuum drum filter and one or more centrifuges, pumps and control systems. A computer 100 is also included for performing various process control tasks.

Figure 6:
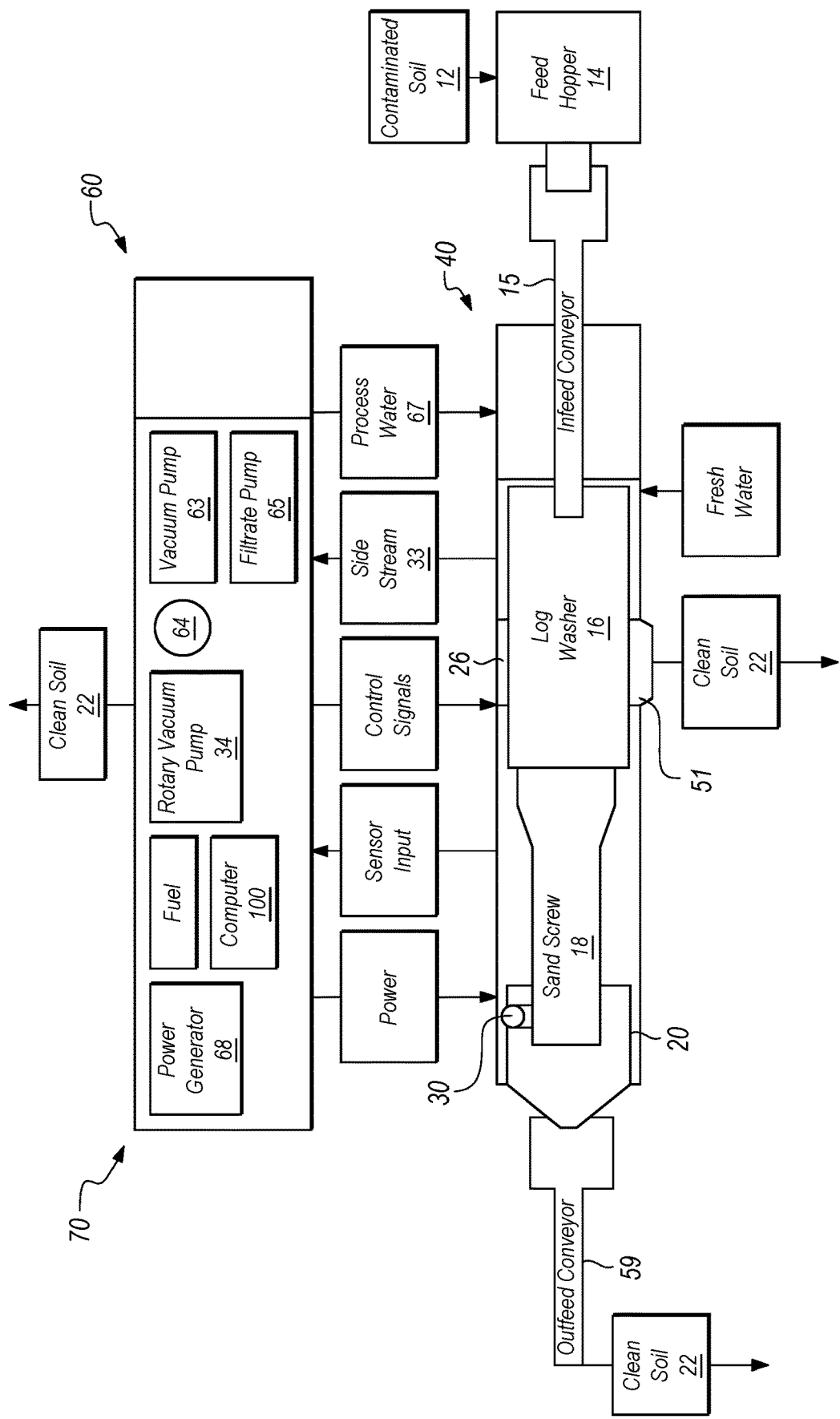
FIG. 6 is a plan view of a work site that may be implemented proximate to a source of contaminated soil.

FIG. 6 is a plan view of a work site 70 that may be implemented proximate to a source of contaminated soil. The contents of work site 70 include the first mobile trailer 40, the second mobile trailer 60, feed hopper 14, infeed conveyor 15, and outfeed conveyor 59. The reference numbers shown in FIG. 6 are the same as those in FIGS. 1-5B, such that a full description is not repeated here. However, after parking the mobile trailers 40, 60 side-by-side as shown, the self-support units 14, 15, 59 are set in place and various connections are established between the two trailers. In this embodiment, the first trailer 40 provides various sensor input and the side stream 33 to the second trailer 60, and the second trailer 60 provides power, control signals and treated process water to the first trailer 40.

Figure 7:
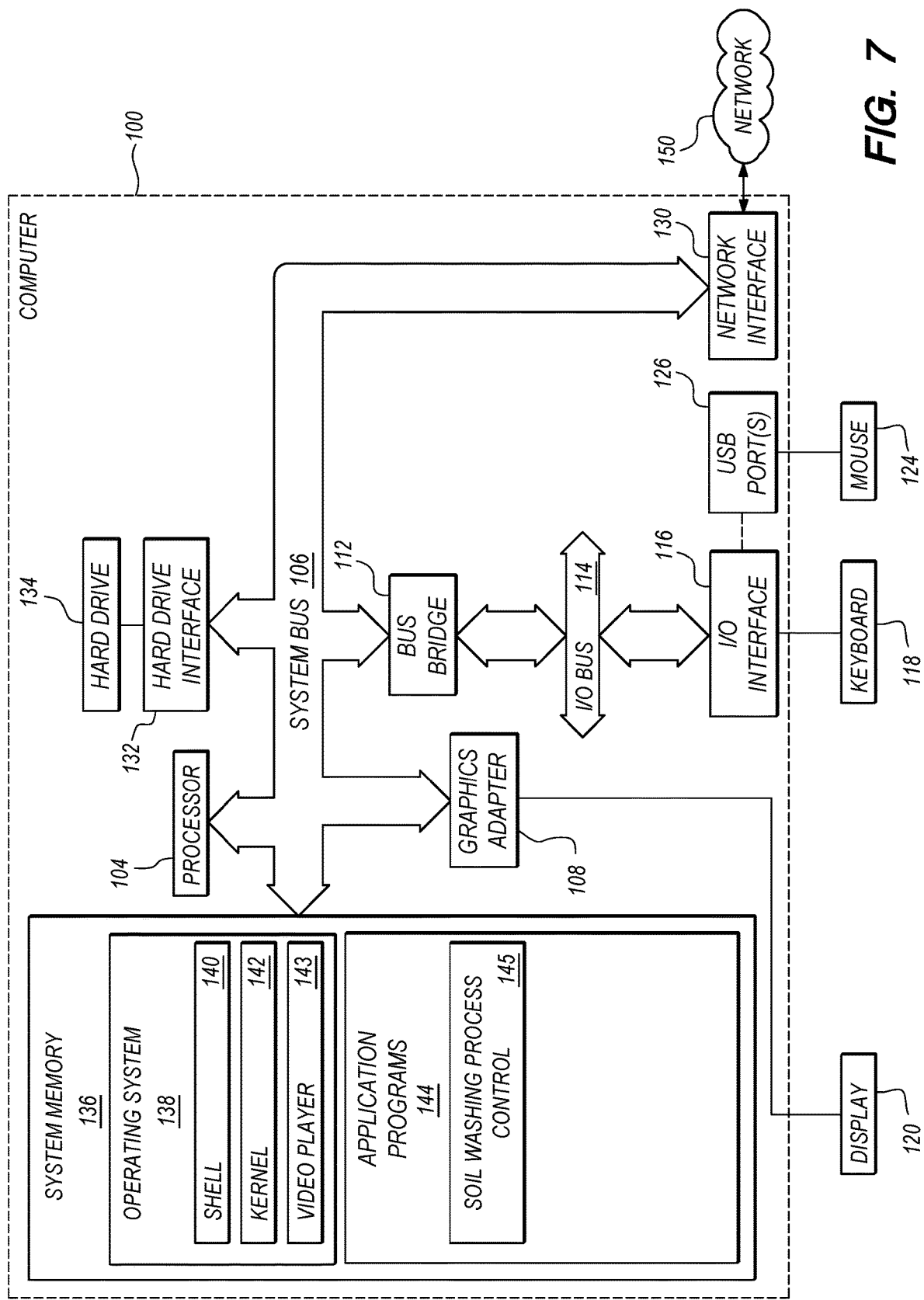
FIG. 7 is a diagram of a computer capable of controlling one or more aspect of the soil washing process.

FIG. 7 is a diagram of a computer 100 capable of controlling one or more aspects of various embodiments of a soil washing process. The computer 100 includes a processor unit 104 that is coupled to a system bus 106. The processor unit 104 may utilize one or more processors, each of which has one or more processor cores. A graphics adapter 108, which drives/supports a display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a keyboard 118 and a USB mouse 124 (or other type of pointing device) via USB port(s) 126. As depicted, the computer 100 is able to communicate with other network devices over the network 150 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, a soil washing process control application 145.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

As will be appreciated by one skilled in the art, embodiments may take the form of a system, method or computer program product. Embodiments of the computer may take the form of hardware, software (including firmware, resident software, micro-code, etc.) or combinations of software and hardware. Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on non-transitory computer readable storage media, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
   mixing water and contaminated soil in a log washer to produce a soil and water mixture;
   separating the soil and water mixture into a first stream of wet soil and a second stream of water and floating organic materials, wherein the separating of the soil and water mixture is performed in a sand screw;
   dewatering the first stream of wet soil to form a cleaned soil stream, wherein dewatering the first stream of wet soil forms a water stream of water removed from dewatering of the first stream of wet soil;
   dewatering the second stream to collect the organic materials and form a water stream of water removed from the second stream;
   separating, using a hydrocyclone, the water stream of water removed from the second stream into a stream of non-colloidal particulates and a stream of colloid-containing water;
   dewatering the stream of non-colloidal particulates;
   adding at least a first portion of the stream of colloid-containing water to soil in the log washer; and
   recycling the water stream of water removed from dewatering of the first stream of wet soil such that the water stream of water removed from dewatering of the first stream of wet soil is mixed with soil.

2. The method of claim 1, further comprising:
   drawing off a second portion of the stream of colloid-containing water; and
   filtering the colloidal particulates from the second portion of the stream of colloid-containing water to form a clean water stream; and
   directing the clean water stream to the log washer.

3. The method of claim 2, further comprising:
   measuring the contaminant concentration in cleaned soil; and
   controlling an amount of water that is discharged and replaced with fresh water to maintain the measured contaminant concentration below a predetermined concentration.

4. The method of claim 1, wherein the cleaned soil stream is produced continuously over a period of time.

5. The method of claim 1, wherein the contaminated soil is contaminated with a water-soluble contaminant.

6. The method of claim 5, wherein the contaminant is a salt.

* * * * *